Figure 1:
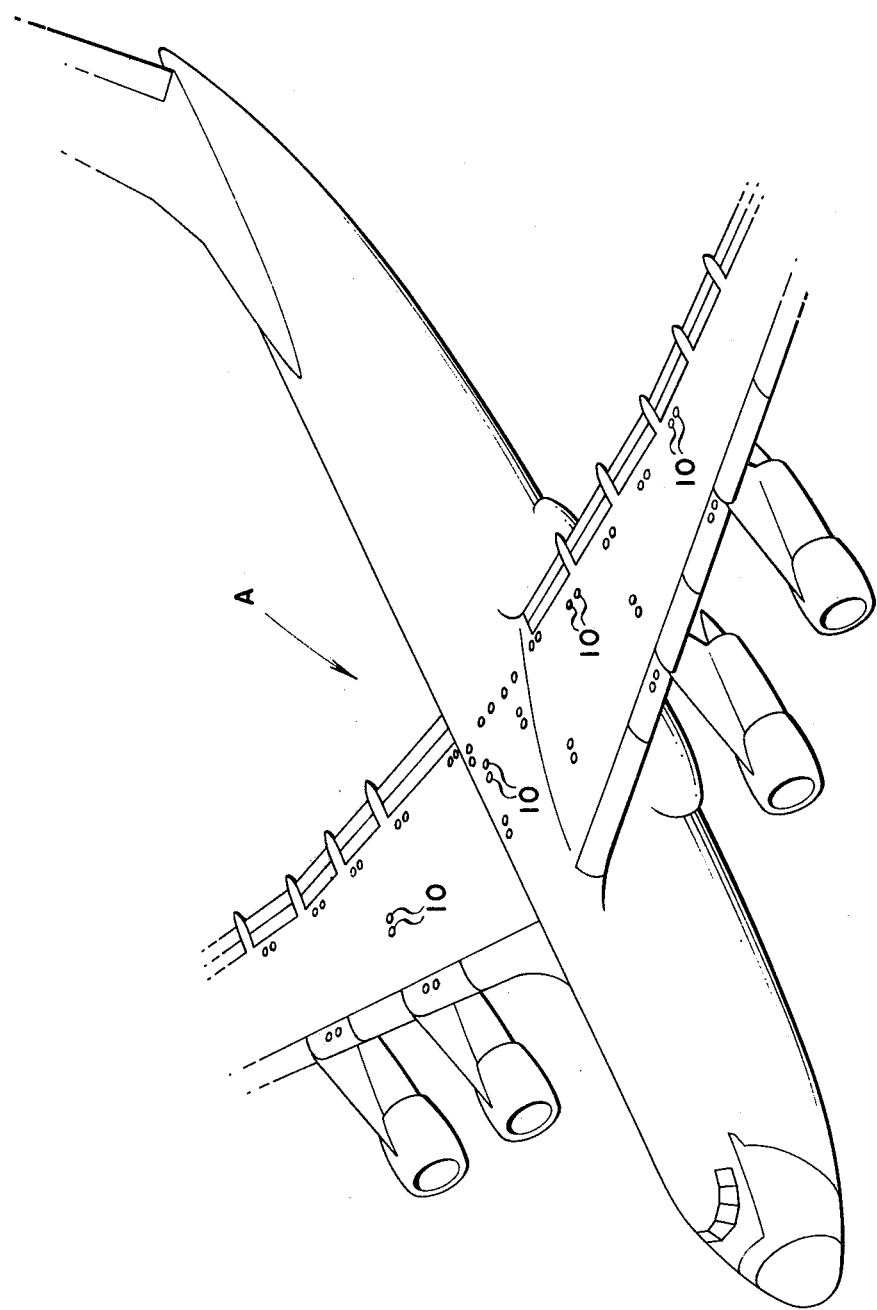

United States Patent [19]
Lewis, Jr.

[11] 3,956,731
[45] May 11, 1976

[54] DETECTION APPARATUS FOR STRUCTURAL FAILURE IN AIRCRAFT EMPLOYING PIEZOELECTRIC TRANSDUCERS

[75] Inventor: William H. Lewis, Jr., Atlanta, Ga.

[73] Assignee: Lockheed Aircraft Corporation, Burbank, Calif.

[22] Filed: Sept. 27, 1974

[21] Appl. No.: 509,915

[52] U.S. Cl. .............................. 340/27 R; 324/71 R
[51] Int. Cl.² .......................................... G08G 5/00
[58] Field of Search............... 340/27, 421; 73/88 R, 73/88.5 SD; 324/71

[56] References Cited
UNITED STATES PATENTS

| | | | |
|---|---|---|---|
| 3,596,269 | 7/1971 | Laska................................. | 340/421 |
| 3,774,443 | 11/1973 | Green et al. ........................ | 73/88 R |

*Primary Examiner*—Marshall M. Curtis
*Attorney, Agent, or Firm*—Billy G. Corber; John J. Sullivan

[57] ABSTRACT

The strain energy that is released when a structural member fails is emitted, among other ways as a broad frequency acoustic emission which is detected by a piezoelectric crystal sized for a preselected natural frequency. This piezoelectric crystal converts the acoustic energy into an electronic signal which is filtered to permit passage of only predetermined frequencies. The filtered signals are then passed through a device which matches the line impedance. A differential amplifier provides signal amplification, and rejects noise, in the received signals which are then passed through a level detector, preset to only allow passage of predetermined signals which in turn trigger a latch for a light emitting diode indicating that a structural failure has occurred.

A built-in tester allows for a periodic check to be made to insure system operation. An amplified signal is oscillated causing the piezoelectric crystals to respond as if they detected an acoustic response from a structural failure which triggers the light emitting diode if the system is functioning properly.

6 Claims, 2 Drawing Figures

DETECTION APPARATUS FOR STRUCTURAL FAILURE IN AIRCRAFT EMPLOYING PIEZOELECTRIC TRANSDUCERS

The invention herein described was made in the course of or under a contract with the United States Air Force.

This invention relates generally to strain energy detectors for structures subjected to varying loads and more particularly to a detection apparatus for structural failures in aircraft.

Present day aircraft are designed and constructed to meet "fail-safe" specifications, i.e. the structure which comprises the major components of the aircraft must be redundant in that a single fracture or failure in the structural element will not cause the destruction of the component. It is, nevertheless, important that the occurrence of such a failure, as well as the location and magnitude of the failure, be known. Otherwise, abnormal flight conditions or a subsequent failure or failures can cause total destruction of the aircraft.

It is also important to know that the on-board failure detection device is operative at all times. Being a passive device or apparatus, i.e. one which only works when there is a structural failure, this requires an input simulating an actual failure to energize the detector to show that it is operative.

Major structural failures have attendant strain energy release rates which result in high amplitude stress wave transients. These transients travel through the structure and generate structural resonances. Flight crews have sometimes reported hearing these resonances on the flight deck of the aircraft but cannot determine the source or location. It has heretofore been proposed to strategically locate acoustic sensors and an accompanying alarm device to monitor and locate the failure events. Another proposal of failure detection has been a contiguous metallic conductor bonded to the structure to exhibit a circuit interrupt when a break exists. Both of these prior methods have inherent capabilities and limitations which leave much to be desired when attempting to satisfy the requirements of an efficient and effective failure detection system for use on aircraft during operation.

Typical acoustic systems used to date have employed microphones to detect noise associated with failures during structural fatigue tests. The microphones are designed for a frequency response in the audible range of from 20 Hz to 20 kHz. Monitoring has been performed by personnel listening to the amplified output of the microphones. This system, however, is not feasible for flight use because ambient background noise in this audible range masks the failure signal.

Wire and conductive paint have also been used for monitoring structures under test conditions. Current activities for these systems involve the development of electrical insulation. However, a reliable system and method for protection from inadvertent damage must be developed in order to use crack wire or conductive paint failure detection systems.

Of the known prior art, U.S. Pat. No. 3,713,125 issued to Keledy et al. on Jan. 23, 1973 is most closely related to the apparatus herein proposed. This patented monitor is designed and constructed to electronically watch cracks that occur in structures and "count" their propagation and when this count reaches a number predetermined to be unsafe issues a warning signal. The Keledy invention fails to appreciate the unique problems associated with dynamic structures like those found in aircraft and consequently does not provide the solution for such problems, nor does it provide for a means of self-checking to determine system operation.

Briefly summarized, the present failure detection apparatus consists of a system of acoustic pick-up devices in the form of piezoelectric transducers secured to the aircraft structure at strategic locations. The strain energy released when a structural member fails is converted to electrical energy and is distinguished from background noise by its frequency and intensity. This signal may be used to trigger various alarm devices, as well as serving as input for flight recorders and failure locating mechanisms.

As an integral part of the detection circuitry there is a built-in test segment provided to check the system to determine if it is working. To this end an amplified signal is oscillated at the specific frequency which causes the piezoelectric transducer or crystal to respond as if it detected an acoustic response from a structural failure. This response, in turn, is indicated at the control station if the circuitry is functioning properly.

More specifically, the piezoelectric transducers are installed in pairs on the structure to be monitored. The amplified signal is transmitted to one of the transducers at the specific frequency to cause it to oscillate and produce sonic vibrations into the structure being monitored. The adjacent piezoelectric transducer is thus caused in turn to oscillate similar in manner to that occurring with a failure and the associated circuitry responds accordingly.

Figure 2:
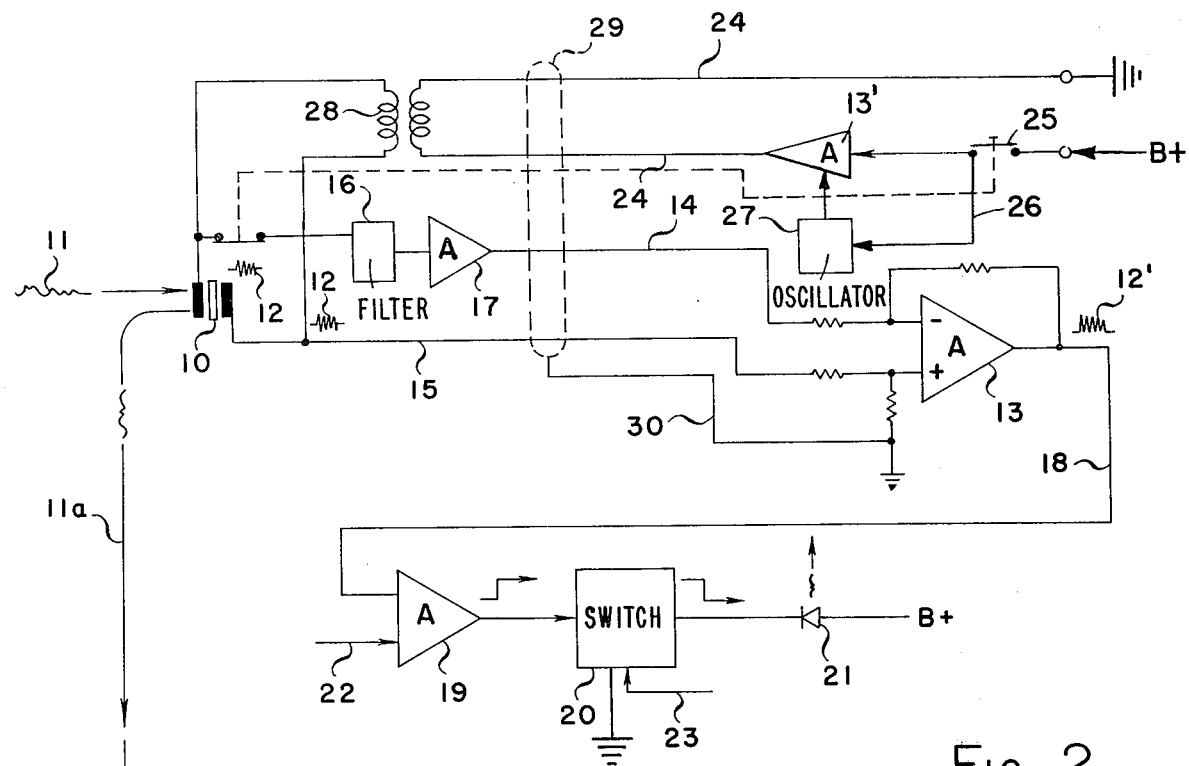
Figure 2:
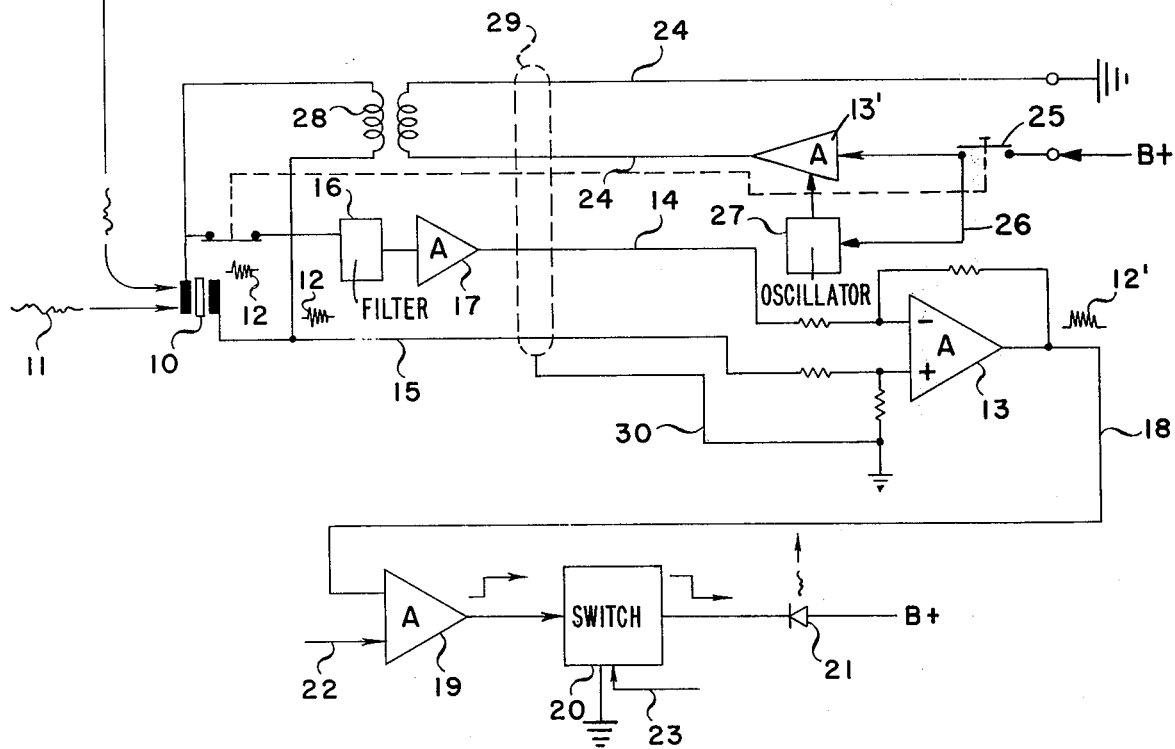

With the above and other objects in view as will be apparent, this invention consists in the construction, combination and arrangement of parts all as hereinafter more fully described, claimed and illustrated in the accompanying drawing wherein:

FIG. 1 is a perspective view taken from the front of and above an aircraft to show generally the location of piezoelectric transducers as contemplated herein on the wings and fuselage; and FIG. 2 is a block diagram of the circuitry which includes each pair of transducers in the failure detection apparatus as herein proposed.

Referring more particularly to the drawings, 10 designates a piezoelectric transducer or crystal adapted to be secured and acoustically coupled in any conventional manner to structure in selected areas of an aircraft A in pairs. Each crystal 10 in such pair is identical one with the other, being sized for a natural frequency, i.e., the frequency at which it gives maximum output, of about 140 kHz. The side of each crystal 10 attached to the aircraft structure serves to pick up acoustic energy, indicated at 11, in the aircraft structure which it converts into an electrical signal indicated at 12.

The opposite sides of both crystals 10 are operatively connected in circuit with a differential amplifier 13 through conductors or lines 14 and 15. A filter 16 is provided in the line 14 which permits the passage of only frequencies of a predetermined level, e.g., on the order of 32 kHz, and above. The signals 12 thus filtered are made to pass through a device such as a unity gain pre-amplifier 17 which matches the line impedance. The differential amplifier 13 rejects the common noise existing in the signals 12 received through lines 14 and 15 including electrical transients commonly found in aircraft, and amplifies the rectified signal 12' for transmission through a conductor or line 18.

The line 18 connects the differential amplifier 13 to a circuit in a power line B+ which circuit includes a voltage level detector 19, and a switch 20 which actuates a signal device 21. More specifically, the detector 19 is preset by the input of a reference voltage 22 to allow the passage only of signals above a predetermined voltage, e.g., 2v, corresponding to those of a structure failure. The switch 20 is set to respond to the voltage passing through the detector 19 and energize the device 21, for example a light emitting diode. This serves as a signal that a structure failure has occurred. The switch or latch 20 may include reset means 23 to turn the diode 21 off after it has performed whereby the system is activated for its next performance. Preferably, means 23 is manually operated, requiring the latch 20 to be intentionally reset to thereby preclude an inadvertent loss of the failure alarm if the system power is interrupted.

An integral part of the system just described is a built-in tester which includes a separate circuit indicated generally at 24 connecting a power line switch 25 to the same side of each crystal 10 as the line 14. When actuated the switch 25 activates the circuit 24 and also disconnects the circuit 14 and 15 from the circuit 24. Each circuit 24 includes a connection 26 to the amplifier 13′ whereby its signal is amplified and an oscillator 27 to vibrate the amplified signal at the specific frequency (about 140 kHz) of the crystals 10. A transformer 28 is incorporated in each circuit 24 to increase the power to the associated crystal 10 so that the resulting vibrating sonic signal 11a transmitted into the adjacent aircraft structure causes the adjacent paired crystal 10 to respond as if it were subject to an acoustic emission accompanying a structure failure. As a result the paired crystal 10 generates an electronic signal 12 which is driven through the amplifier 13 and voltage level detector 19 as previously described which eventually triggers the light emitting diode 21 if the system is functioning properly.

As indicated schematically at 29 the several conductors or lines 14, 15 and 24 are each shielded as for example wrapped within an electrically conductive material to prevent transient signals from being induced into any of the failure detection circuitry.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. An apparatus for the detection of structural failures in aircraft comprising:
   at least one pair of piezoelectric transducers adapted to be secured to a component of the aircraft in a predetermined area, each of said transducers being sized for a specific resonance and adapted to convert said resonance into electrical energy of a predetermined frequency;
   a first electrical circuit connected to each transducer and including a filter and a differential amplifier to pass only signals of a selected frequency, a voltage level detector to receive said selected frequency signals and preset to pass only signals of a predetermined voltage, a switch responsive to said predetermined voltage signals and an indicator actuated by the operation of said switch; and
   a second electrical circuit connected to each transducer and including a power line with an on-off control, an oscillator activated by said control when operative to generate electrical signals in the associated second circuit at the predetermined frequency aforesaid and a transformer to amplify the voltage of said generated signals to a level sufficient to pass the voltage level detector aforesaid, said on-off control including a circuit maker and breaker in said first circuit and being operative to alternately connect either one of said circuits.

2. The apparatus of claim 1 wherein said piezoelectric transducers are each sized to a natural frequency of about 140 kHz.

3. The apparatus of claim 2 wherein the selected frequency level of each said filter is on the order of 32 kHz and above.

4. The apparatus of claim 3 wherein the predetermined voltage setting of each said detector is 2v.

5. The apparatus of claim 1 wherein said indicator is a light emitting diode.

6. The apparatus of claim 5 wherein said switch includes manually-operated means to reset it after operation.

* * * * *